United States Patent [19]

Loscoe

[11] Patent Number: 4,628,501
[45] Date of Patent: Dec. 9, 1986

[54] OPTICAL COMMUNICATIONS SYSTEMS

[75] Inventor: Claire E. Loscoe, Howell, N.J.

[73] Assignee: The United States of America as represented by the Secretary of the Army, Washington, D.C.

[21] Appl. No.: 566,622

[22] Filed: Dec. 29, 1983

[51] Int. Cl.$^4$ .............................................. H04B 9/00
[52] U.S. Cl. .......................................... 370/3; 370/4; 455/607; 455/612
[58] Field of Search ............... 370/1, 3, 4; 455/606, 455/607, 610, 612, 601; 350/96.16

[56] References Cited

U.S. PATENT DOCUMENTS

| | | | |
|---|---|---|---|
| 3,803,405 | 4/1974 | Ohnsorge et al. | 370/4 |
| 4,027,153 | 5/1977 | Kach | 350/96.16 |
| 4,092,059 | 5/1978 | Hawkes et al. | 350/96.16 |
| 4,107,518 | 8/1978 | McMahon | 455/612 |
| 4,227,260 | 10/1980 | Vojvodich et al. | 455/601 |
| 4,234,968 | 11/1980 | Singh | 455/607 |

FOREIGN PATENT DOCUMENTS

| | | | |
|---|---|---|---|
| 58-106926 | 6/1983 | Japan | 370/4 |
| 2111337 | 6/1983 | United Kingdom | 455/601 |

OTHER PUBLICATIONS

Rawson—"Fibernet"—IEEE Transaction on Comm., vol. COM-26, No. 7, Jul. 1978, pp. 983-990.
Herold et al.—"Optical Fiber System"—Proceedings of the IEEE, vol. 68—No. 10—Oct. 1980, pp. 1309-1315.

*Primary Examiner*—Joseph A. Orsino, Jr.
*Attorney, Agent, or Firm*—Sheldon Kanars; Jeremiah G. Murray; John T. Rehberg

[57] ABSTRACT

A multipoint fiber optical communication system which can carry both voice and data traffic which achieves both full duplex operation and long range with a minimum of apparatus. An active star coupler receives signals from all connected users and provides amplified replicas of all of these received signals to all users. The system may utilize time division or wavelength division multiplex techniques and one embodiment requires only a single optical fiber connecting each user station to the active star coupler.

8 Claims, 6 Drawing Figures

OPTICAL COMMUNICATIONS SYSTEMS

The invention described herein may be manufactured, used, and licensed by or for the Government for governmental purposes without the payment to me of any royalties thereon.

BACKGROUND OF THE INVENTION

The field of this invention is optical communications systems, and more particularly systems of this type which employ optical fibers which are used to transmit intelligence by means of modulated light beams or waves. The intelligence transmitted may be either data or voice. The use of digital transmission utilizing time division multiplex techniques facilitates the transmission of both voice and data signals. In such a system the voice or any other analog signal to be transmitted is sampled and transmitted as pulse amplitude modulation or coded into a binary number proportional to the amplitude thereof (pulse code modulation). The system of the present invention utilizes a time division multiplex technique known as Time Division Multiple Access (TDMA) in which each of the multiple users transmits on the same wavelength in sequence in a different time slot for pulse transmission and the fiber optics of all users are interconnected by means of a star type coupler which receives each user's transmission and re-transmits all received signals to all users. Such a system has the capability of full duplex transmission wherein any pair of connected users can carry on two way communication simultaneously with all other user pairs. To accomplish this each user transmits on his time slot and listens or receives on the other user's time slot.

The advantages of fiber optic transmission compared to wire are well known. For example, the reduced dispersion of coherent light compared to lower frequency incoherent waves requires fewer repeaters to re-shape the square waves used for digital transmission. Also, fiber optics are not susceptible to electrical or magnetic interference such as is often caused by magnetic storms or lightning and optical cables are more difficult to tap than electrical wires or cables. This latter feature makes fiber optics advantageous for military tactical operations.

Prior art optical communications systems of the type mentioned above have used passive star couplers to interconnect the users. These passive star couplers comprise merely a means to receive transmissions from all connected users and distribute the received transmissions to all users. Two known types of couplers for accomplishing this connection are transmissive couplers in which all incoming optical fibers are applied to one end of a mixing rod and all of the output fibers are connected to the other end thereof. Another type of coupler for this purpose is the reflective coupler which comprises a rod with both the input and output fibers connected to one end thereof and a mirror at the opposite end. These passive couplers split the energy of all incoming light signals between all of the connected users and in addition attenuate the incoming signals so that for large systems with numerous users the light signal strength available for retransmission is small, thus restricting system range.

SUMMARY OF THE INVENTION

The present invention is a multi-point fiber optic communication system which utilizes an active star coupler. The active star coupler comprises a transponder which detects all received light signals, amplifies them and then re-transmits the amplified signals to all connected users. The system can be designed so that each user is connected to the active star coupler by separate receive and transmit optical fibers or by the use of a simple additional optical duplexer for each user and different wavelengths for transmission and reception. Full duplex transmission can be carried on with only a single optical fiber connecting each user station to the central active star coupler. The active star coupler may include a single light source controlled by the detected incoming signals with the output of the single light source distributed equally to all outgoing fibers, or it may have separate light sources for each outgoing fiber. Another embodiment includes separate light detectors for each incoming fiber and also separate light sources for each outgoing fiber.

It is thus an object of the present invention to provide an improved TDMA fiber optic communication system which can achieve long distance full duplex communication between multiple users and is capable of carrying digitized analog signals such as voice signals and/or data signals.

A further object of the invention is to provide a novel and useful optical transponder which functions as part of an active star coupler in a multipoint fiber optic communications system which may be of the time division multiplex, the wavelength multiplexed type or the statistically multiplexed type.

A still further object of the invention is to provide an active star coupler in which incoming optical signals are coupled into a common light detector, the output of which is amplified to form the outgoing optical signals.

Another object of the invention is to provide a multipoint fiber optical communication system for carrying both voice and data traffic which achieves both full duplex operation and long range with a minimum of circuitry and equipment.

These and other objects and advantages of the invention will become apparent from the following detailed description and the drawings.

DETAILED DESCRIPTION OF A PREFERRED EMBODIMENT

Figure 1:
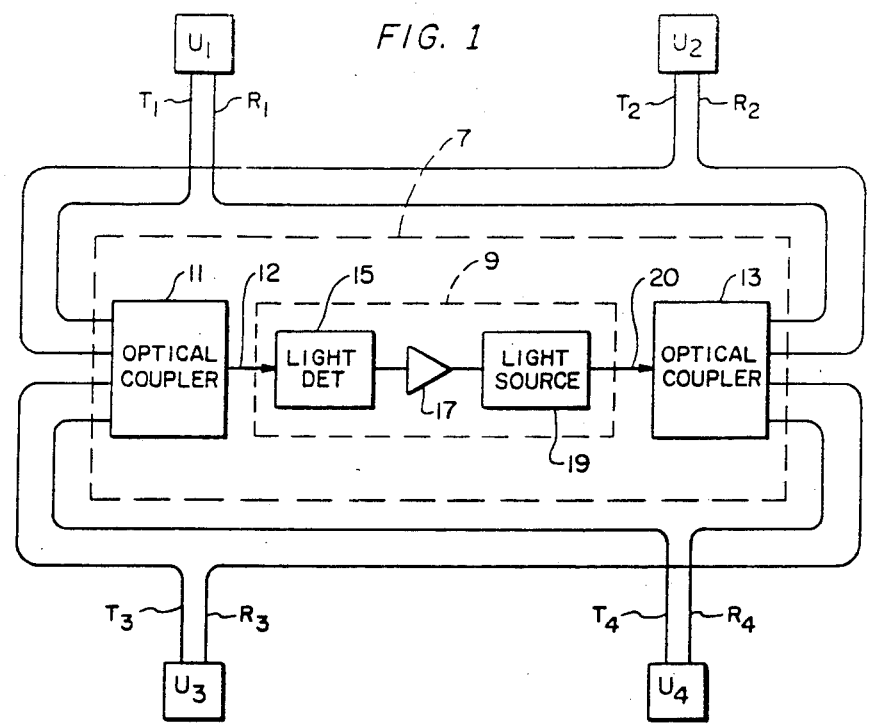
FIG. 1 is a circuit diagram of one embodiment of the invention.

The optical communication system of FIG. 1 comprises a plurality of user stations, four of which are shown in this illustrative circuit diagram. These user stations are designated as $U_1$–$U_4$. Each user station is connected to the active star coupler 7 by means of a pair of optical fibers, one of which is used for transmitting to the star coupler and the other of which is used to receive from the star coupler. The transmitting fiber of $U_1$ is $T_1$ and the receiving fiber thereof is $R_1$, etc. As can be seen in the drawing, all of the transmitting fibers of all user stations are applied to an input optical coupler 11 which combines the light signals on these four fibers to a single composite signal on a single fiber 12 which is applied to a light detector 15 which converts the composite light signal to an electrical signal. This electrical signal is amplified by amplifier 17, the output of which controls light source 19 to produce in the output thereof an amplified light signal which is a replica of that applied to light detector 15 from optical coupler 11. The output of light source 19 is applied to output light coupler 13 which splits the amplified light signal into four equal parts which form the received light signals $R_1-R_4$ of the four user stations. The optical couplers 11 and 13 can be identical in structure and may be transmissive light couplers of the type described above but having a plurality of fibers connected on one end of the mixing rod but only a single fiber connected to the other end thereof. Thus the input coupler 11 would have the four transmitting fibers $T_1-T_4$ connected to one end of the mixing rod therein and the single output fiber 12 connected to the other end thereof. The coupler 13 would have the output of light source 19 connected by the single fiber 20 to one end of its mixing rod with the four receiving fibers $R_1-R_4$ connected to the other end thereof.

As stated above, the optical communication system of this invention is of the time division multiplex multiple access type. This is a known system in which each user transmits one or more pulses or bits of information during a slot alloted to him. In more complex systems each of the user stations would comprise a plurality of user terminals which would together comprise a location which would, in the embodiment of FIG. 1, share the optical fibers $T_1$, $R_1$, etc. for transmitting and reception to and from the star coupler. Each group of users at a location would have their time slots groups into blocks, with blocks from all of the different locations groups into frames. The frame frequency would be selected to accommodate the highest bit rate to be transmitted, in accordance with well known practice.

In the TDMA system of this type each user transmits during his time slot and the star coupler combines all of the transmitted time slots of all user stations and sends them to all users on the fiber optic links $R_1-R_4$. Thus all user stations receive all transmissions of all other users plus their own transmission. Each user station includes a transmitter for modulating the intelligence to be transmitted onto its transmit time slot and onto its transmit optical fiber. Users carry on duplex communication by tuning to the time slot of the other party with which it is desired to communicate.

Figure 2:
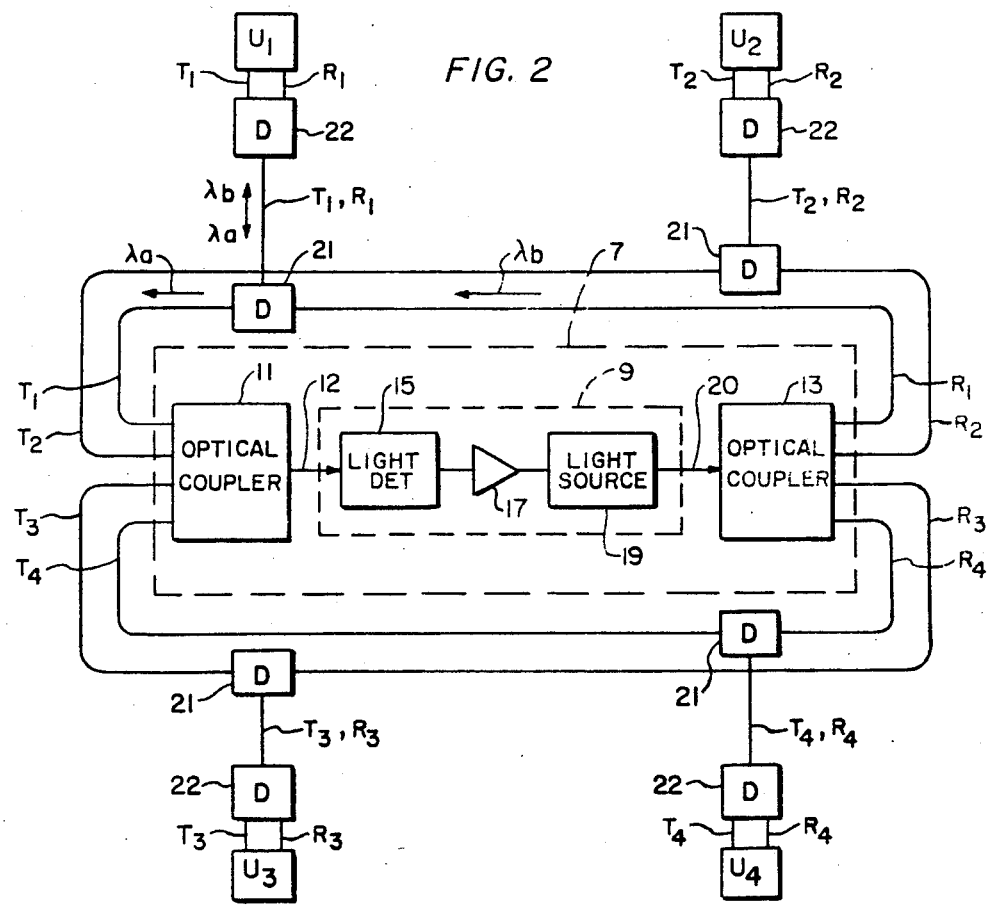
FIG. 2 is another embodiment of the invention which utilizes a single optical fiber to connect each user station to the active star coupler.

The light source 19 of FIG. 1 may be a non-coherent light producing device such as a light emitting diode (LED), or it may be a coherent source such as an injection laser diode. Each of the user stations $U_1-U_4$ would include a light source for generating its transmitted signal on optical fibers $T_1-T_4$. The wavelengths of all light sources of FIG. 1 may be the same of all of the user stations may transmit to the active star coupler on one wavelength and the light source 19 may operate on a different wavelength. If the star coupler converts the received wavelength to another wavelength in this manner, the apparatus of FIG. 2 can be used to simplify the system so that only a single optical fiber need be used to connect each user station to the active star coupler. In FIG. 2 the active star coupler 7 would be the same as that of FIG. 1, however each of the single fibers $T_1$, $R_1$, etc., which connect each user station to the star coupler would be connected to a simple optical duplexer 21 co-located with the star coupler which duplexer directs the transmitted signals $T_1$ etc., from each of the user stations to the input optical coupler 11 and directs the amplified received signals $R_1$, etc., from the output of the active star coupler to the user stations on the single optical fiber $T_1$, $R_1$, etc. As shown in FIG. 2, the single optical fiber $T_1$, $R_1$ of user station $U_1$ carries two wavelengths, $\lambda_a$ and $\lambda_b$ traveling in opposite directions therein simultaneously. The signal at $\lambda_a$ represents the transmitted signal, $T_1$ of user station $U_1$ and this signal is directed by the optical duplexer 21 to the input optical coupler 11 of the active star coupler. The second wavelength $\lambda_b$ corresponds to the wavelength produced by light source 19 of the active star coupler of FIG. 2 and this signal forms the received signal $R_1$ traveling toward user station $U_1$.

Another similar optical duplexer 22 is required at each of the user stations to separate the transmit and receiver signals on the single fiber. The duplexer 22 at station $U_1$ has transmit fiber $T_1$ connected thereto from the transmitter of $U_1$ and has receive fiber $R_1$ connected thereto for carrying received signals at wavelength $\lambda_b$ to the receiver of $U_1$. The optical duplexers 21 and 22 may comprise any well known type of optical device for separating light beams on the basis of wavelength, for example these devices may comprise a prism which will refract the wavelength of the transmitter signal $T_1$ to the fiber labelled $\lambda_a$ which of the transmitter signal $T_1$ of optical coupler 11, and will refract the different wavelength $\lambda_b$ of the received signal $R_1$ from the output of the active star coupler into the single optical fiber $T_1$, $R_1$ for transmission to user station $U_1$. Other types of wavelength sensitive devices such as dichroic filters or diffraction gratings may be used in these optical duplexers. Since the two light signals in the single optical fiber are at different wavelengths, there will be no interference or crosstalk between these signals traveling in different directions in the same fiber.

Figure 3:
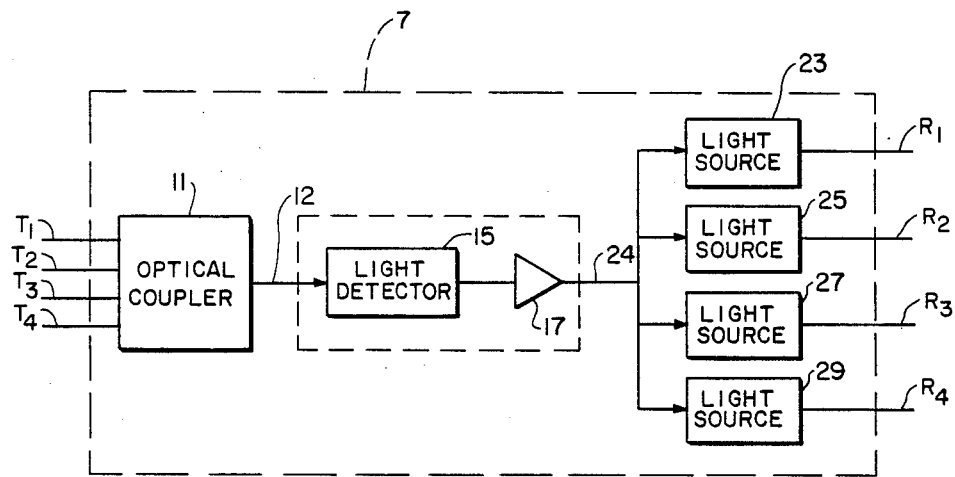
FIGS. 3 and 4 show alternate embodiments of active star couplers which may be used in the systems of either FIGS. 1 or 2.

FIG. 3 shows a modified version of an active star coupler which can be used in place of that of FIGS. 1 or 2. This star coupler 7 is similar to that of FIGS. 1 or 2 in that it includes an input optical coupler 11 connected to all of the transmitting fibers $T_1-T_4$, a single light detector 15 which detects the combined output of coupler 11 connected thereto by optical fiber 12, and an amplifier 17 to amplify the electrical signal from detector 15. It differs in the use of separate light sources 23, 25, 27, and 29 for each connected user station, with the output of amplifier 17 connected in parallel to the input of each of the light sources. Thus each of the receiving signal fibers $R_1-R_4$ has its own light source. This eliminates the distortion and attenuation which would result from the use of a second optical coupler in the output of the star coupler and provides higher intensity light output since a separate light source is applied to each outgoing fiber. This higher light intensity permits longer range operation.

Figure 4:
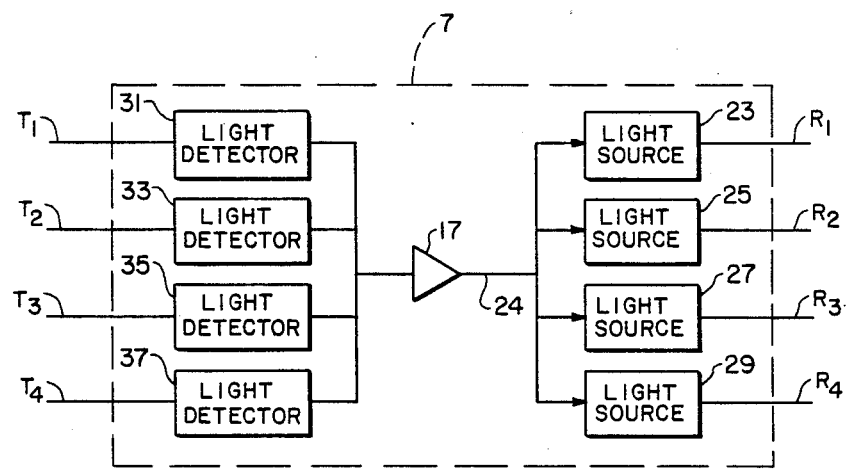

The embodiment of the active star coupler of FIG. 4 is a modification of FIG. 3 which further includes separate light detectors 31, 33, 35, and 37 for each incoming transmitted optical signal $T_1-T_4$. This eliminates the need for an input optical coupler with its disadvantages noted above. The outputs of all the light detectors, which are electrical signals, are all tied together in parallel and amplified by amplifier 17, the output of which, 24, is connected to the inputs of the four separate light sources 23, 25, 27, and 29, as in the embodiment of FIG. 3, to form the outgoing received light signals $R_1$–$R_4$.

Figure 5:
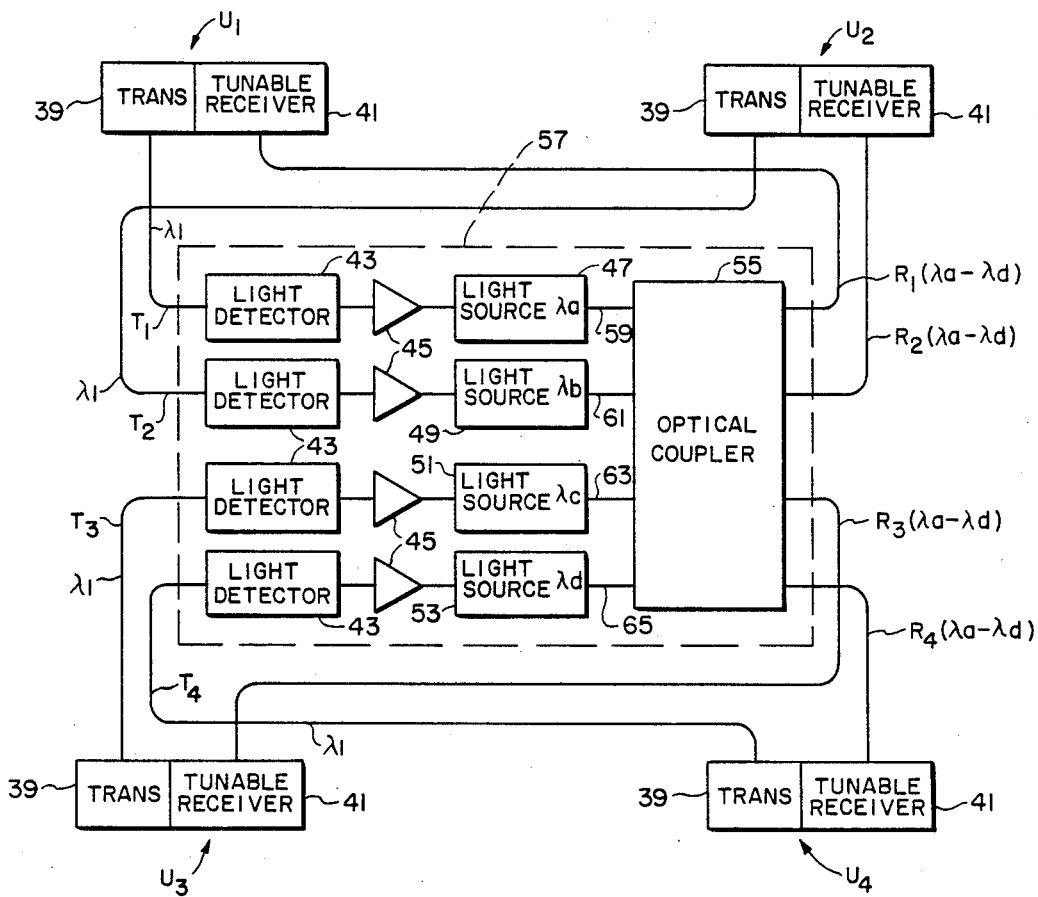
FIGS. 5 and 6 shows how the invention can be applied to an optical communication system of the wavelength diversity type.

FIG. 5 shows how the concept of this invention can be applied to a wavelength diversity optical communication system in which each user station is connected to the central active transponder or star coupler 57 by means of separate transmit and receive optical fibers and all user stations transmit on the same wavelength, $\lambda_1$. All of the transmitted signals on fibers labelled $T_1$–$T_4$ at wavelength $\lambda_1$ are applied to separate light detectors 43, the outputs of which are amplified by separate amplifiers 45. Each amplifier 45 is connected to a separate light source 47, 49, 51, and 53 which each produce a different wavelength $\lambda_a$, $\lambda_b$, $\lambda_c$ and $\lambda_d$, respectively, corresponding to the four user stations $U_1$–$U_4$. An optical coupler 55 receives these four different wavelength signals with the intelligence from each of the user stations thereon, via optical fibers 59, 61, 63 and 65 and combines them onto each of its four output optical fibers $R_1$–$R_4$. Each of these four fibers are connected to a different one of the four user stations to form the receiver signals thereof. These receiving signal fibers thus all include the transmitted signals of all user stations $U_1$–$U_4$, from the transmitters 39 thereof on a different wavelength. The user stations all include a tunable receiver 41 to which the receiving signal fibers are applied. These tunable receivers include a means to optically tune to the wavelength of any user station with which it is desired to communicate. For example, the tunable receivers may comprise a diffraction grating arranged to select a different desired one of the wavelengths $\lambda_a$–$\lambda_d$ and the grating would be placed over the end of the receiving fibers to select one wavelength from the plurality of wavelengths on each receiving fiber. A wavelength diversity system of this type need not use time division techniques and can transmit and receive signals from all users simultaneously. This eliminates the need for sampling and framing circuitry and reduces the system complexity.

The active star coupler or transponder 57 of FIG. 5 may be used with a pair of optical duplexers such as 21 and 22 of FIG. 2 to allow connection between the user stations and the active star coupler by means of single optical fibers.

Figure 6:
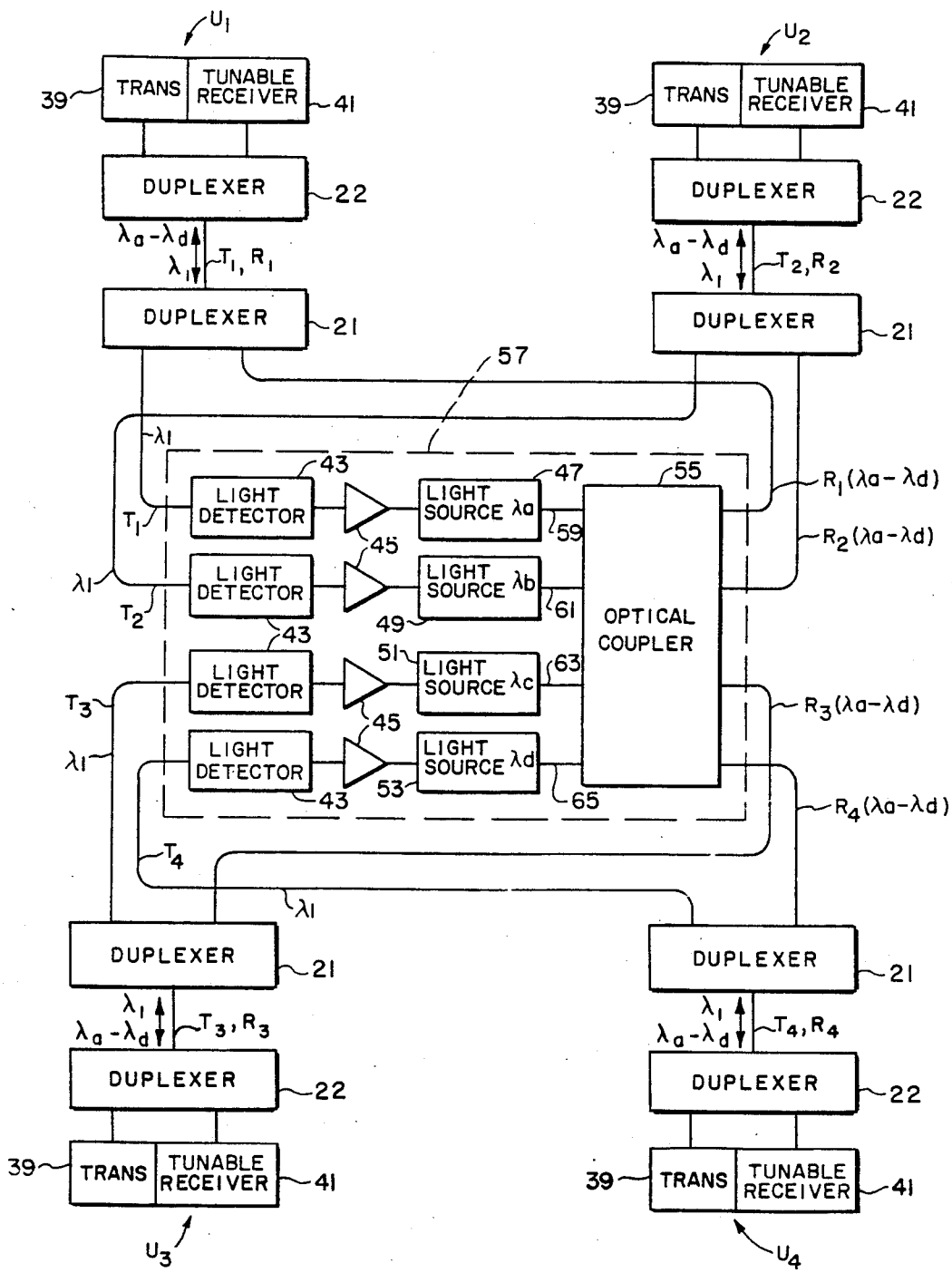

FIG. 6 illustrates the use of an active star coupler 57 with a pair of duplexers 21, to permit single-fiber connection between user stations and the active star coupler.

The use of active star couplers such as those disclosed herein permit longer range operation and/or the connection of more user stations because of the amplification feature thereof, and in addition the embodiments which translate the incoming wavelength permit full duplex operation with only a single fiber connecting each user station to the active star coupler.

The invention is not limited to the TDMA and wavelength diversity system illustrated, but is applicable to both static and dynamic channel allocation techniques. The invention is essentially a means for distributing or broadcasting information to multiple users.

While the invention has been described in connection with illustrative embodiments, obvious variations thereof will occur to those skilled in the art, accordingly the invention should be limited only by the scope of the appended claims.

I claim:

1. A wavelength diversity optical communication system comprising a plurality of user stations each connected to a central active star coupler by means of separate transmit and receive optical fibers and wherein all of said user stations comprise transmitters and tunable receivers, all of which transmitters operate on the same wavelength, $\lambda_1$, said star coupler comprising means to detect transmitted signals from all of said user stations on said transmit optical fibers at wavelength $\lambda_1$, and produce separate light signals at different wavelengths for each of said user stations, means to apply each of said separate light signals to an optical coupler having an output optical fiber for each of said user stations with the intelligence of all said user stations modulated thereon at a different wavelength, said output optical fibers comprising the receive signal fibers of said user stations, and wherein said tunable receiers can be tuned to any desired one of said different wavelengths.

2. A multipoint fiber optic communication system comprising:
a plurality of user stations and a central star coupler, each of said user stations including an optical signal transmitter and receiver, and a first wavelength selective optical duplexer for separating transmitted and received optical signals, all of said optical signal transmitters operating on the same wavelength; a plurality of second wavelength selective optical duplexers located at said star coupler, each second duplexer being associated with a respective first duplexer, a single individual respective fiber connecting each said first and second respective duplexers, said star coupler including means to detect all optical signals emitted from said user stations via said second duplexers, means to amplify the detected optical signals to produce an amplified electrical signal, and a plurality of optical signal sources controlled by said electrical signal, said optical signal sources operating on a wavelength which is different from said wavelength of said transmitter optical signals, and a further plurality of optical fibers connecting said star coupler optical signal sources to respective optical duplexers.

3. A wavelength division or diversity optical communication system comprising a plurality of user stations and a central active star coupler, each of said user stations including an optical signal transmitter, a tunable optical signal receiver and a first optical duplexer, a plurality of second optical duplexers associated with said star coupler, said first optical duplexers separating the transmitted and received optical signals, a single optical fiber respectively connecting each of said first optical duplexers to a respective second optical duplexer for carrying said transmitted and received signals therebetween, said star coupler including a plurality of light detector means, each said detector means detecting transmitted signals from a respective said user station, and means to produce separate light signals at different wavelengths for each of said user stations, a plurality of input fibers connecting respective second duplexers to respective light detector means, and means to apply each of said separate light signals to an optical coupler having an output fiber for each of said user stations with the intelligence of all of said user stations modulated thereon at different wavelengths, each of said second optical duplexers being connected to respective output fibers, and wherein said tunable receivers can be tuned to any one of said different wavelengths.

4. A multipoint fiber optic communication system comprising: a plurality of user stations each including an optical signal transmitter and receiver, each of said transmitters operating on the same wavelength, each user station including a first wavelength selective optical duplexer, a central active star coupler, said active star coupler including a plurality of second respective wavelength selective optical duplexers, each of said first optical duplexers being connected to a said second respective optical duplexer by a single optical fiber, said active star coupler including means to detect all optical signals transmitted via said single optical fibers and said first and second duplexers by said user stations, means to amplify the detected optical signals to produce an amplified electrical signal, and optical signal source means controleed by said electrical signal, said optical signal source having an output wavelength which is different from the wavelength of said transmitters of each of said user stations, and means for distributing the output wavelength of said optical signal source to all of said user stations via said single optical fibers and said first and second duplexers as the received signals thereof.

5. The system of claim 4 wherein said system is of the wavelength diversity type.

6. The system of claim 4 wherein said system is of the statistical multiplexed type.

7. The system of claim 4 wherein said system is of the Time Division Multiple Access type.

8. The system of claim 7 wherein said system assigns to each user a different exclusive time slot per frame for respective sequential transmission.

* * * * *